July 18, 1961 P. M. STIGLIC ET AL 2,992,633
FLUID PRESSURE OPERATED SERVO ACTUATOR
Filed May 26, 1959 2 Sheets-Sheet 1
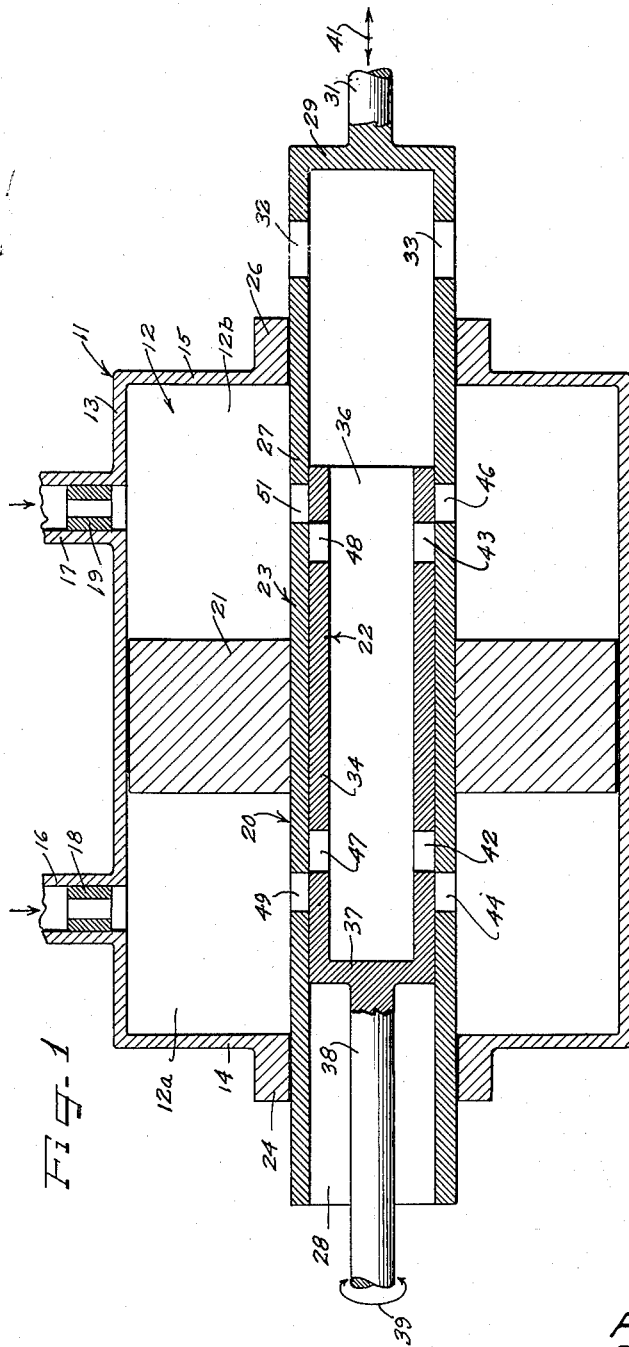
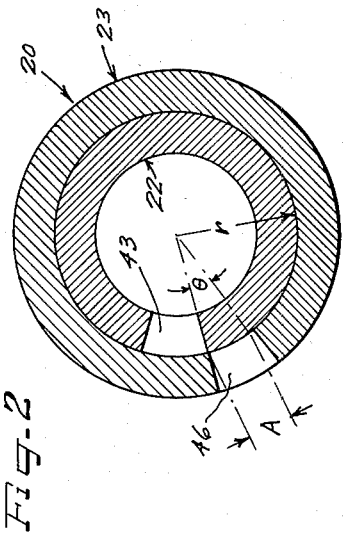
Inventors
Paul M. Stiglic
Donald D. Carrell

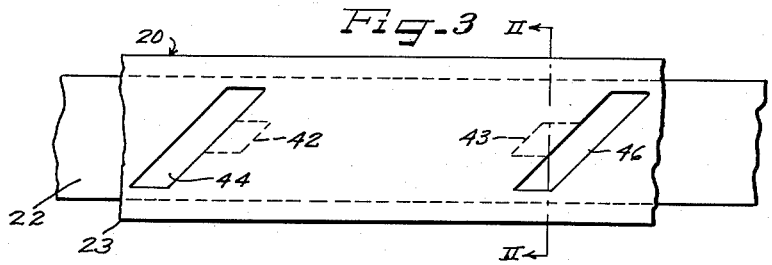
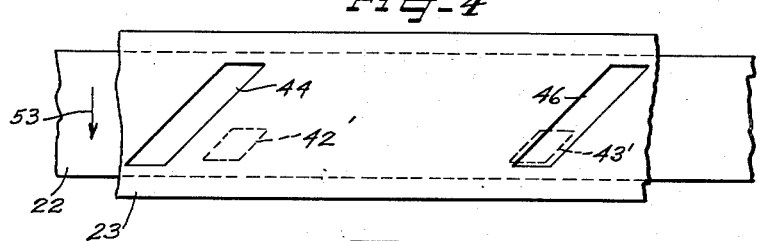
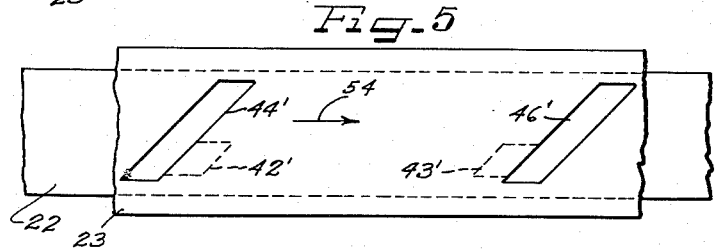
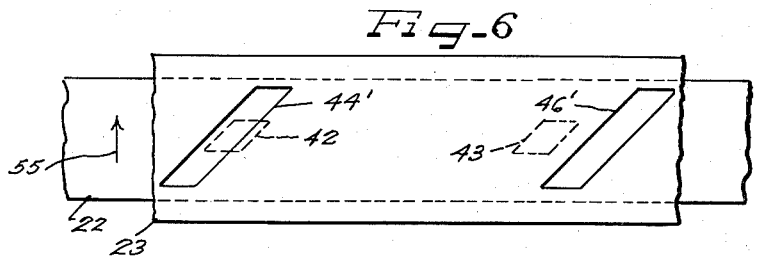
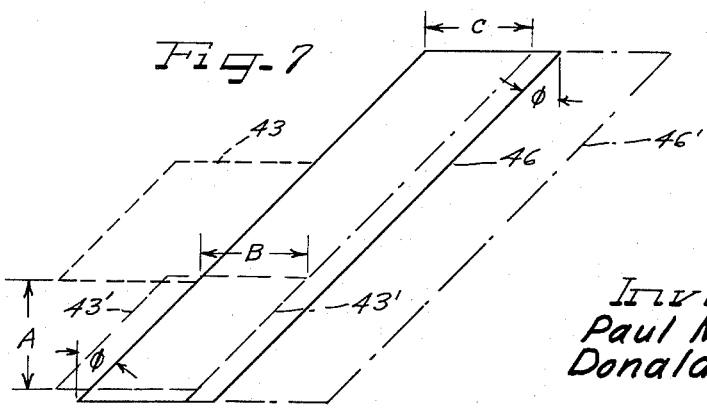
Inventors
Paul M. Stiglic
Donald D. Carrell

United States Patent Office 2,992,633
Patented July 18, 1961

2,992,633
FLUID PRESSURE OPERATED SERVO ACTUATOR
Paul M. Stiglic, Wickliffe, and Donald D. Carrell, Cleveland, Ohio, assignors to Thompson Ramo Wooldridge Inc., Cleveland, Ohio, a corporation of Ohio
Filed May 26, 1959, Ser. No. 815,987
3 Claims. (Cl. 121—41)

The present invention relates to improvements in servo actuator mechanisms and more particularly to a pressurized fluid operated closed center servo actuator wherein a rotary input signal is supplied and the output force is linear.

The invention particularly contemplates providing a servo actuator having a cylindrical pressure chamber with pressurized fluid lines connected to each end and with a piston slidable within the chamber. A valve mechanism releases the fluid from either end of the chamber in response to a rotary input signal to cause a pressure drop across the piston to provide a linear output. The valve mechanism includes a cylindrical follow-up valve member secured to the piston and axially slidable therewith to provide the output signal, and also includes a cylindrical control valve member telescopically slidable within the follow-up valve member and adapted to be rotated therein. The control valve member has a pair of first ports with one port positioned on each side of the piston and the follow-up member has a pair of second ports positioned axially outside of and adjacent the first ports. The second ports are elongated and extend helically so that rotation of the control member in either direction will cause overlapping between one of the first ports and one of the second ports, and the resultant pressure drop in the chamber at one side of the piston causes a follow-up movement of the follow-up valve member.

An object of the invention is to provide an improved servo mechanism of a closed-center type (where flow occurs only during periods of actuation) wherein good resolution is obtained and break away frictional lags are reduced.

Another object of the invention is to provide an improved servo actuator wherein the designed input-output relationship can easily be varied.

Another object of the invention is to provide an improved fluid operated servo actuator wherein the input signal is rotational and the output force is linear.

Another object of the invention is to provide a fluid pressure actuated servo operator having improved operating characteristics and having improved manufacturing design features.

Other objects and advantages will become more apparent with the teachings of the principles of the invention in the disclosure of the preferred embodiment in the specification, claims and drawings, in which:

FIGURE 1 is a vertical sectional view, shown partially in schematic form, of a servo actuator embodying the principles of the present invention;

FIGURE 2 is a vertical sectional line taken substantially along line II—II of FIGURE 3 with one set of valve ports being omitted for simplicity of illustration;

FIGURE 3 is an elevational view of the valve mechanism illustrating the relative positions of the ports when the valve parts are at rest;

FIGURE 4 is an elevational view similar to FIGURE 3 but showing the control valve rotated to provide an input signal to the device;

FIGURE 5 is an elevational view similar to FIGURE 4, illustrating the position of the valve parts after follow-up movement in response to the signal of FIGURE 4;

FIGURE 6 is an elevational view similar to FIGURES 3–5, but illustrating the relative position of the valve parts with a rotational input signal in the direction opposite the input signal of FIGURE 4; and FIGURE 7 is a diagrammatic view illustrating a set of valve ports arranged in an enlarged laid out "unrolled" surface view.

As shown on the drawings:

The servo actuator embodiment illustrated in FIGURE 1 includes a housing 11 defining an elongated cylindrical chamber 12 therein. The housing includes a cylindrical outer wall 13 which is joined by radial end walls 14 and 15.

A fluid pressure line 16 connects to one end 12a of the chamber 12 and another similar fluid pressure line 17 connects to the other end 12b of the chamber. These lines are supplied with pressurized fluid, such as air, from a suitable source at an equal pressure. The lines are preferably provided with pressure drop orifice inserts 18 and 19 to provide a pressure drop for the air entering the ends of the chamber for rapid drop in pressure as the air is vented from either end of the chamber to obtain a pressure differential across a piston 21.

The piston 21 is slidable in the chamber 12, and is normally located at a substantially central position, as illustrated in FIGURE 1, and moves in either axial direction with pressure differential across the cylinder.

The actuator mechanism is the closed-center type wherein no flow of the pressurized operating fluid occurs until the mechanism is actuated by an input signal. The flow of operating fluid is controlled by a valve mechanism 20. While other pressurized fluids may be utilized, for purposes of the present disclosure, the operating fluid will be referred to as air.

The valve mechanism includes a control valve member 22 and a follow-up valve member 23. In the preferred form, each of these members is cylindrical in shape being provided with a tubular body, and the control valve member is telescopically received inside of the outer follow-up valve member.

The follow-up valve member extends axially through the chamber 12 and has a tubular body 27 which is slidingly supported in annular bosses 24 and 26 integral with the end walls 14 and 15 of the chamber. The follow-up valve member 23 has an open end 28 for receiving the control valve member and the other end 29 is closed and carries a rod 31 for connecting the mechanism to be actuated by the follow-up output force of the follow-up valve member 23. Lateral ports 32 and 33 are open from the exposed end of the follow-up valve member for the relief of air when it is permitted to escape from the chamber 12.

The control valve member 22 has a tubular body 34 which is slidable within the body 27, and the control valve member 22 has an open end 36 and a closed end 37 to which is connected a rod 38 which permits rotating the control valve member, as indicated by the arrow 39. The rod may be driven in rotation by a suitable means, such as by being connected to a torque motor. Rotary motion of a torque motor can, therefore, be directly used, and break away friction resistance acts only to the radius of the valve member 22, rather than through a lever arm of the torque motor which is necessary in mechanisms heretofore used wherein a control valve had to be reciprocated linearly by a control torque motor. With the present mechanism, resolution may be improved over devices heretofore used by as much as the factor of ten. The output of the actuator is still linear in the direction indicated by the arrow 41.

The control valve member 22 is provided with a first pair of ports 42 and 43. The follow-up member is provided with a pair of second ports 44 and 46, with the second ports being axially spaced from the first ports, on opposite sides thereof, and preferably on the outside of said first ports.

The control valve member may have other first ports 47 and 48 and the follow-up valve member may have other second ports 49 and 51. Inasmuch as these ports are preferably identical in structure and positon, only one group need be described in detail, and ports 42, 43, 44 and 46 will be described in connection with the change in port positions with movement of the valve members in FIGURES 3 through 6.

One of the pairs of ports is elongated and extends helically along the surface of the valve member. As illustrated in FIGURE 3, the second pair of ports 44 and 46, in the control valve member 23 are preferably elongated, and are illustrated as parallelogram in shape. The first pair of ports 42 and 43, although they may be formed in other shapes, are also preferably parallelogram, with the sides of the first ports substantially parallel to the sides of the second ports. Each of the ports of the first pair, and each of the ports of the second pair are located on opposite sides of the piston 21 so that when the first and second ports overlap, air will escape from the chamber 12 on either side of the piston to cause a pressure differential thereacross and follow-up movement of the piston and the control valve member.

In the position of the valve members 22 and 23 illustrated in FIGURE 3, the mechanism is at rest and no input signal is received. In FIGURE 4, the control valve member 22 is rotated in the direction of the arrow 53 to move the first valve port 43 to the position shown at 43' in FIGURE 4, thereby causing it to overlap the second port 46. Port 42 has moved to positon 42'. This overlap of ports permits a pressure drop in the end 12b of the chamber 12 moving the piston and follow-up valve member 23 to the right, as illustrated by the arrow 54 in FIGURE 5. The follow-up position is illustrated in FIGURE 5 with the second port 46 shown in the position 46'. The second port 44 moves in the position 44'. This moves the ports back to their original relative alignment, and the pressure across the piston 21 will again immediately equalize, and therefore, the follow-up valve member will have moved a linear distance which is a function of the rotational distance the control valve member was moved by the input signal.

When an input signal rotates the control valve member 22 in the other direction, as indicated by the arrow 55 the first ports will move to the positions 42 and 43, shown in FIGURE 6. Port 42 will overlap port 44 and a pressure drop will occur in the end 12a of the chamber 12 and the piston 21 will move the follow-up valve member 23 to the left from the position of FIGURE 6 back to its original position of FIGURE 3.

This arrangement permits the motion gain to be easily controlled by original design in the control of the helix angle of the second port and the control of the diameter of the control valve member.

As illustrated primarily in FIGURES 2 and 7, when the control valve member 22 is rotated through an angle $\theta$, its port (illustrated by the port 43) moves a distance A. This distance A may also be termed as distance Y if the distances are plotted on the X, Y axes. The movement of the follow-up valve member 23 is shown at C in FIGURE 7, and this is equal to the overlap distance B of the first port 43 relative to the second port 46. The helix angle of the second port 46 is shown as $\phi$. (B may be regarded as X on the X, Y axes.)

It will be seen that where:

A = movement of first valve port of control member, and
B = movement of second valve port in follow-up member (piston displacement), $$A = r\theta$$

where:
r = radius of control valve cylinder
$\theta$ = angle of rotation of control valve cylinder Also:

$$\frac{B}{A} = \tan \phi$$

where: $\phi$ = helix angle of second valve port in follow-up valve member.

The gain of the servo actuator may then be expressed:

$$\text{Gain} = \frac{B}{\theta} = \frac{Br}{A} = r \tan \phi$$

The gain is, therefore, a function of the helix angle of the second valve port of the follow-up valve member, and is also a function of the radius of the control valve member.

In summary of operation, the control valve member 22 is rotated in either direction to cause an alignment or change in overlap between one of said first and second ports, such as 42 and 44, or 43 and 46 in FIGURE 1. The ports which are aligned will permit escape of air from one side of the piston and the pressure differential will cause the piston to drive the follow-up valve member in a linear direction until the ports are restored to their original position.

It will thus be seen that we have provided an improved servo actuator which meets the objectives and advantages hereinbefore set forth and wherein resolution is greatly improved and gain can be more easily controlled than in devices heretofore provided.

It will be recognized that the follow-up motion can be provided by means other than the piston, and the ports may be arranged in various relationships as a variation of the preferred embodiment, so that change in valve port overlap will generate operation of a response mechanism for moving the follow-up valve member. Also, other changes and variations within the spirit and scope of the invention may be made, as will be recognized by those skilled in the art.

We have, in the drawings and specification, presented a detailed disclosure of the preferred embodiment of our invention, and it is to be understood that we do not intend to limit the invention to the specific form disclosed, but intend to cover all modifications, changes and alternative constructions and methods falling within the scope of the principles taught by our invention.

We claim as our invention:

1. An actuator control mechanism comprising in combination a cylindrically shaped elongated pressure chamber, a first pressure fluid supply line connected to one end of said chamber, a second fluid pressure supply line connected to the other end of said chamber, a flow restrictor positioned in each of said lines, a piston slidably located in said chamber and axially movable positioned between said supply lines, an elongated tubular follow-up member extending through said chamber and connected to said piston to move axially therewith, means at one end of said follow-up member for connecting a load, a fluid escape port on said one end of said tubular follow-up member opening from the outer surface thereof for the escape of fluid into the atmosphere, the other end of said follow-up member being open, a tubular shaped control valve member slid into the open end of said follow-up member and having an open end facing said port of the follow-up member for the escape of pressurized fluid and having a closed end, means attached to the closed end of said control valve member for driving the control valve member in rotation, a pair of first ports in said control valve member spaced axially along the control valve member on opposite sides of said piston, and a pair of second ports in said follow-up member extending in the same helical direction along said follow-up member and at the same helical angle and positioned axially outside of said first port so that rotation of said control valve member in either direction will bring one of said first ports into overlapping position relative to one of said second ports to permit the flow of pressurized fluid from the chamber from one side of said piston to drive the piston in a direction to move said follow-up member and move said ports out of overlapping position.

2. An actuator control mechanism comprising in combination means defining an elongated control chamber, a first fluid pressure supply line connected to one end of said chamber, a second fluid pressure supply line connected to the other end of said chamber, a piston slidably housed within said chamber between said supply lines, an elongated axially extending tubular follow-up valve member extending through said chamber and opening exteriorly thereof for the escape of pressurized fluid, a tubular control valve member teelescopically positioned within said follow-up valve member, means connected to said control valve member for driving the control valve member in rotation and to deliver an input signal thereto, means connected to said follow-up member for receiving an axial output follow-up force therefrom, a pair of first ports in said control valve member spaced axially from each other and positioned on opposite sides of the piston, and a pair of second ports in said follow-up valve member positioned axially of said first ports and on opposite sides thereof, one of said pair of ports being elongated in shape and extending helically along the valve member in substantially the same helical angle so that rotation of the control member in either direction will bring one of said first ports into alignment with one of said second ports permitting fluid to flow from the chamber at one side of the piston therethrough and causing a drop in pressure so that the piston will move the follow-up member correspondingly to again move the ports out of alignment.

3. An actuator control mechanism comprising in combination an elongated tubular control valve member, an elongated tubular follow-up valve member telescopically mating with said control valve member, a pair of axially spaced first ports in said control valve member, a pair of axially spaced second ports in said follow-up valve member positioned adjacent to said first ports and on opposite sides thereof, the ports of one of said pairs of ports extending helically along the valve member so that either relative rotation or relative axial movement between the valve members will move the ports into or out of alignment, a first fluid pressure chamber communicating with one of the ports of one of said pairs, a pressure line communicating with said chamber for supplying pressurized fluid thereto, a second pressure chamber communicating with the other port of said one pair, a pressure line communicating with said second chamber for supplying pressurized fluid thereto, driving means connected to said follow-up member being responsive to drop in pressure in either of said chambers for driving said follow-up member correspondingly, and another driving means connected to said control valve member for driving it in accordance with an input signal, one of said driving means moving the valve member in rotation and the other of said driving means moving the valve member axially.

References Cited in the file of this patent
UNITED STATES PATENTS

| | | |
|---|---|---|
| 1,484,030 | Kitchen | Feb. 19, 1924 |
| 2,244,296 | Heinrich et al. | June 3, 1941 |
| 2,544,035 | Marshall et al. | Mar. 6, 1951 |
| 2,898,890 | Lynott | Aug. 11, 1959 |

FOREIGN PATENTS

| | | |
|---|---|---|
| 464,891 | Great Britain | Apr. 27, 1937 |